(12) United States Patent  
Han

(10) Patent No.: US 7,437,056 B2
(45) Date of Patent: Oct. 14, 2008

(54) COMBINATION SYSTEM AND COPY ERROR PREVENTING METHOD THEREOF

(75) Inventor: Hong-gyu Han, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1095 days.

(21) Appl. No.: 10/145,027

(22) Filed: May 15, 2002

(65) Prior Publication Data

US 2002/0172501 A1 Nov. 21, 2002

(30) Foreign Application Priority Data

May 18, 2001 (KR) ................ 2001-27273

(51) Int. Cl.
*H04N 5/76* (2006.01)
*H04N 5/00* (2006.01)

(52) U.S. Cl. ........................ 386/94; 386/125

(58) Field of Classification Search .......... 386/52, 386/55, 1, 45, 33, 69–70, 125–126, 94; 348/700–702; 360/60; 380/201, 203; 388/1, 94
See application file for complete search history.

(56) References Cited

U.S. PATENT DOCUMENTS 6,311,011 B1 * 10/2001 Kuroda ................ 386/46
6,370,319 B1 * 4/2002 Matsumoto et al. ......... 386/94
6,678,465 B1 * 1/2004 Swan ..................... 386/94
6,813,436 B1 * 11/2004 Hirai ...................... 386/94
7,039,298 B1 * 5/2006 Watkins .................. 386/125
7,046,607 B2 * 5/2006 Yamada .................. 369/53.21

FOREIGN PATENT DOCUMENTS

CN 1221177 A 6/1999
JP 08-102906 4/1996

OTHER PUBLICATIONS

Office Action issued by the Chinese Patent Office on Dec. 31, 2004, with respect to Chinese Patent Application No. 02126291.8, filed May 18, 2002.

* cited by examiner

*Primary Examiner*—Thai Tran
*Assistant Examiner*—Nigar Chowdhury
(74) *Attorney, Agent, or Firm*—Staas & Halsey LLP

(57) ABSTRACT

A combo system and method having a play unit to play a signal recorded on a first recording medium and a recording unit to record the signal played by the play unit on a second recording medium. A detector detects whether a predetermined copy preventing signal exists within the signal played by the play unit. A controller controls the recording unit to stop a recording operation of the recording unit when the copy preventing signal is detected by the detector.

36 Claims, 4 Drawing Sheets

COMBINATION SYSTEM AND COPY ERROR PREVENTING METHOD THEREOF

CROSS-REFERENCE TO RELATED APPLICATIONS

This application claims the benefit of Korean Application No. 2001-27273, filed May 18, 2001, in the Korean Patent Office, the disclosure of which is incorporated herein by reference.

BACKGROUND OF THE INVENTION

1. Field of the Invention

The present invention relates to a combination system and a copy error preventing method thereof, and more particularly, to a combination system and a copy error preventing method thereof in which a copy preventing signal is added to a copy signal so that a copy error can be prevented from occurring.

2. Description of the Related Art

A combination system or combo system is defined as two or more different units incorporated into a combined system. As an example of the combo system, there is provided a DVD/VCR combo system developed to compositively perform a function of a DVDP and a function of a VCR.

FIG. 1 is a block diagram illustrating a conventional DVDP/VCR combo system 10 and peripheral devices connected to the DVDP/VCR combo system. The DVDP/VCR combo system 10 includes a VCR 11 and a DVDP 12. The VCR 11 performs a general VCR function that plays video and audio signals recorded on a magnetic tape and records externally received signals on the magnetic tape. The DVDP 12 performs a general DVDP function that plays video and audio signals recorded on a DVD. In addition to essential functions of the VCR 11 and the DVDP 12, the DVDP/VCR combo system 10 has an advantage in that the DVDP/VCR combo system 10 can perform a composite function that records video and audio signals played by the DVDP 12 on the magnetic tap through the VCR 11.

A TV 23 is connected to the DVDP/VCR combo system 10 as a peripheral device that outputs video and audio signals played by the DVDP 12 or the VCR 11. Also, an audio amplifier 21 is connected to the DVDP/VCR combo system 10 as a peripheral device that outputs audio signals played by the DVDP 12. Furthermore, an external device 25 such as a camcorder can be connected to the DVDP/VCR combo system 10. The DVDP/VCR combo system 10 serves to record/play video and audio signals from the external device 25.

The VCR 11 and the DVDP 12 in the DVDP/VCR combo system 10 are provided as one system in appearance. A user can switch a mode between the VCR 11 and the DVDP 12 through either a separate input unit such as a remote controller 15 or a panel (not shown) provided on a front surface of the DVDP/VCR combo system 10 and can manipulate individual functions of the respective devices 11 and 12 using the separate input unit. As described above, the DVDP/VCR combo system 10 has an advantage in that the system can perform various functions without the peripheral devices.

However, in a case where video and audio signals played by the DVDP 12 are recorded on the magnetic tape through the VCR 11, a problem arises in that desired video and audio signals cannot be recorded. The reason for the problem is because DVD data has a copy preventing mechanism such as a macrovision protection (hereinafter, referred to as "macrovision signal"). The macrovision protection is an analog protection system. The VCR 11 adds a vertical blanking signal AGC pulse and a color bar to a composite video signal and s-video signal. In this case, a synchronizing and automatic recording level circuit in the VCR 11 may be disordered or there may be something wrong with a line doubler. In other words, in a case where the DVD data having a macrovision protection is recorded or copied, phenomena such as a color bar, distortion, rolling, blackening, and brightness circulation may occur. Accordingly, in the case where the data recorded on the DVD having the macrovision protection is recorded or copied on the magnetic tape using the DVDP/VCR the combo system 10, a problem arises in that the data cannot be normally recorded or copied on the magnetic tape due to the macrovision protection of the DVD.

Furthermore, in the case where the magnetic tape is played in which the data is not normally recorded or copied, the user cannot view a desired video image. In this case, the user may incorrectly believe that there is something wrong with the recording function of the DVDP/VCR combo system.

SUMMARY OF THE INVENTION

Accordingly, it is an object of the present invention to provide a combination system and an error preventing method thereof, in which whether a macrovision protection has been applied to DVD data is detected, so that a copy error can be prevented from occurring.

To achieve the above and other objects, the present invention may be accomplished by providing a combination system and an error preventing method thereof, in which a user can recognize that a macrovision protection is applied to DVD data to be copied, so that performance of the combination system can be improved.

In order to achieve the above-described object and other objects of the present invention, there is provided a combo system provided having a play unit to play a signal recorded on a first recording medium and a recording unit to record the signal played by the play unit on a second recording medium, including: a detector to detect whether a predetermined copy preventing signal exists within the signal played by the play unit; and a controller to control the recording unit to stop a recording operation of the recording unit when the copy preventing signal is detected by the detector.

Here, the combination system further includes a display block to externally display a signal indicative of whether the copy preventing signal has been detected.

To achieve the above and other objects, the present invention may be accomplished by providing a copy error preventing method of a combo system provided with a play unit and a recording unit, including: playing a signal recorded on a first recording medium using the play unit; recording the signal onto a second recording medium using the recording unit; detecting whether a predetermined copy preventing signal exists within the signal played by the play unit; and stopping a recording operation of the recording unit when the copy preventing signal is detected within the played signal.

To achieve the above and other objects, the present invention may be accomplished by providing a copy error preventing method between a play unit and a recording unit, including: playing a signal recorded on a first recording medium using the play unit; recording the signal onto a second recording medium using the recording unit; detecting whether a predetermined copy preventing signal exists within the signal played by the play unit; and stopping a recording operation of the recording unit when the copy preventing signal is detected within the played signal.

To achieve the above and other objects, the present invention may be accomplished by providing a combo system, including: a play unit playing video and/or audio signals recorded on a first recording medium; a recording unit recording the video and/or audio signals on a second recording medium; a detector detecting a copy preventing signal from the video and/or audio signals played by the play unit, wherein the detector outputs the detected copy preventing signal to the recording unit to stop the recording unit from recording the video and/or audio signals on the second recording medium; and an OSD block adding an OSD function to the video signals of the recording unit and a detected copy preventing error message.

To achieve the above and other objects, the present invention may be accomplished by providing a copy error preventing method of a combo system having a play unit and a recording unit, including: detecting a copy command by the recording unit; outputting a copy mode setting signal from the recording unit to the play unit; playing data recorded on a first recording medium using the play unit in response to the copy mode setting signal; recording the data onto a second recording medium using the recording unit; determining whether a copy preventing signal exists in the data recorded on the first recording medium; outputting the copy preventing signal to the recording unit; and stopping the recording unit from recording in response to the copy preventing signal without discontinuing playing the data recorded on the first recording medium.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

A combination system and a copy error preventing method thereof, in accordance with exemplary embodiments of the present invention, will now be described in detail with reference to the accompanying drawings.

Figure 1:
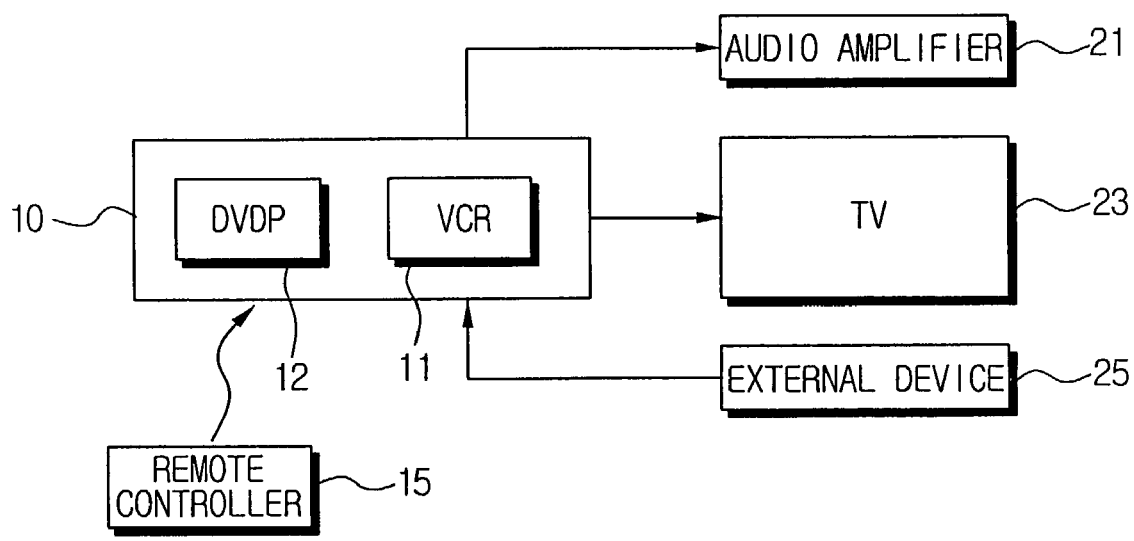
FIG. 1 is a block diagram illustrating a conventional DVDP/VCR combination system.
Figure 2:
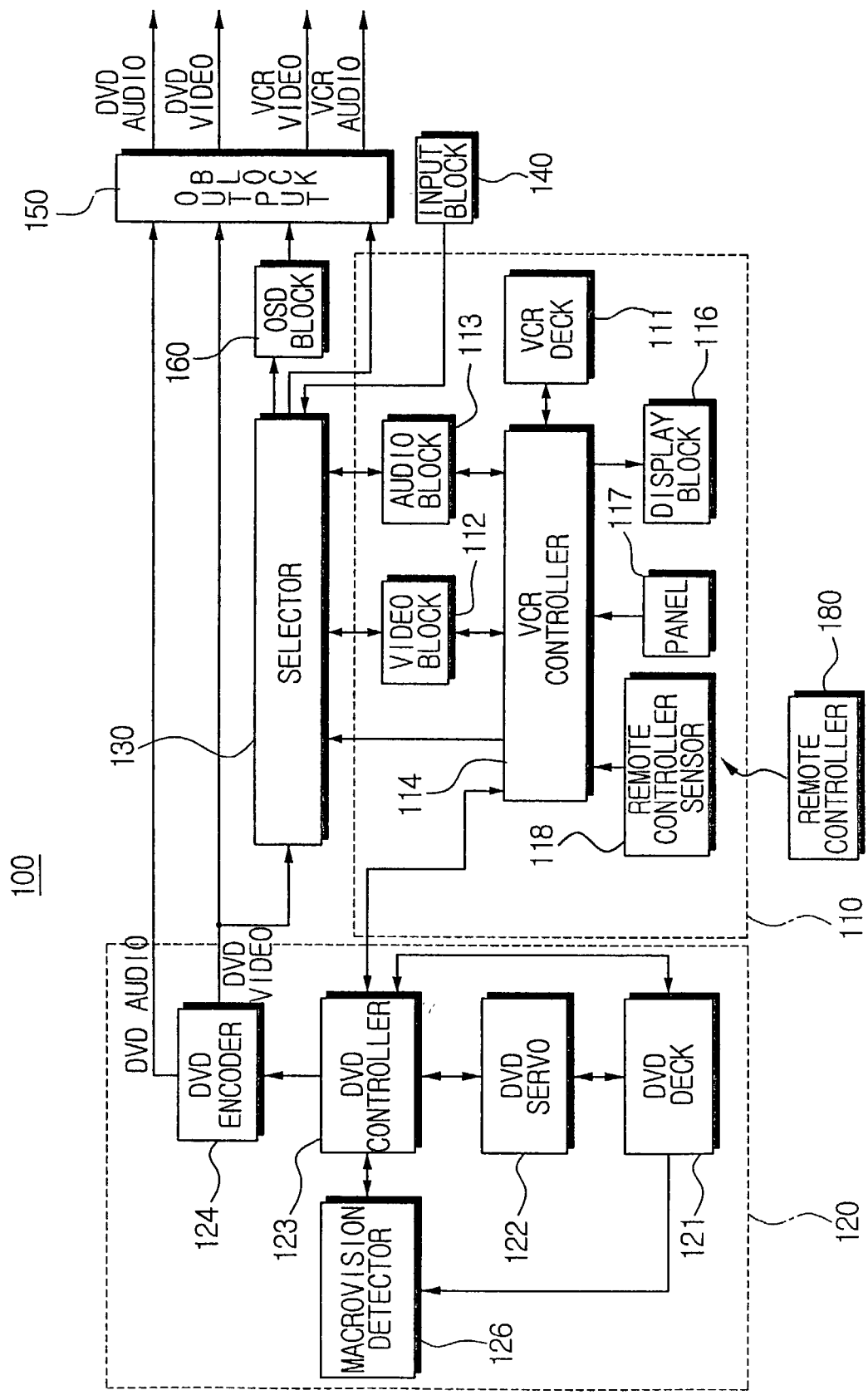
FIG. 2 is a block diagram illustrating a DVDP/VCR combination system in accordance with a first embodiment of the present invention.

FIG. 2 is a detailed block diagram illustrating a combo system in accordance with a first embodiment of the present invention, particularly a DVDP/VCR combo system 100 that can perform DVDP and VCR functions. The DVDP/VCR combo system 100 includes a VCR 110 to perform a general VCR function, a DVDP 120 to perform a general DVDP function, a selector 130 to select signals output from the VCR 110 and the DVDP 120, and an input block 140 to transmit signals input from an external device, such as a camcorder to the selector 130. An output block 150 transmits the signals output from the VCR 110 and the DVDP 120 to peripheral devices such as a TV and an amplifier. An on screen display (OSD) block 160 in the DVDP/VCR combo system 100 adds an OSD function to video signals output from the VCR 110 and the DVDP 120.

The VCR 110 includes a VCR deck 111 for recording a signal on a magnetic tape or playing the signal recorded on the magnetic tape. Video and audio blocks 112 and 113 in the VCR 110 transmit and receive video and audio signals to be recorded or played to and from the VCR deck 111, and a VCR controller 114 controls an operation of the VCR deck 111, the video block 112, and the audio block 113. The VCR 110 further includes a display block 116 to externally display the status of the VCR 110 such as operational, control, and setting modes, a panel 117 to input various commands from a user, and a remote controller sensor 118 to input a command from the user through a remote controller 180.

The DVDP 120 includes a DVD deck 121, a DVD servo 122, a DVD controller 123, and a DVD encoder 124. The DVD deck 121 reads data recorded on a DVD to perform a play mode of the DVD. The DVD servo 122 receives the data read by the DVD deck 121 through the DVD controller 123, and outputs DVD video data and DVD audio data. The DVD controller 123 controls the operation of the DVD deck 121, the DVD servo 122, and the DVD encoder 124. The DVDP 120 further includes a macrovision detector 126 for detecting a macrovision signal. The macrovision detector 126 detects the macrovision signal from the data read by the DVD deck 121 if the DVD has a macrovision protection and is played or copied. The macrovision detector 126 outputs the detected macrovision signal to the DVD controller 123. Then, the DVD controller 123 transmits the detected macrovision signal to the VCR controller 114.

The DVD controller 123 and the VCR controller 114, as will be described later in detail, are linked to each other in accordance with the detected macrovision signal, so that signals for controlling the DVDP 120 and the VCR 110 are generated. In the exemplary embodiment of the present invention, the VCR controller 114 and the DVD controller 123 may be separately provided and the VCR controller 114 may be used as a main controller of the combo system 100. However, the present invention is not limited to this embodiment. That is, the DVD controller 123 may be the main controller of the DVDP/VCR combo system 100 or a menu controller having both the functions of the VCR controller 114 and the DVD controller 123 may be used.

An output of the DVD encoder 124, outputs of the video and audio blocks 112 and 113, and the signals from the input block 140 are input as input signals to a selector 130. The VCR controller 114 and the DVD controller 123 control the selector 130 to select input signals. An output signal from the selector 130 is input to the OSD block 160 and the output block 150. The OSD block 160 adds the OSD function to the signal input from the selector 130 and generates video images. Accordingly, the video images generated by the OSD block 160 are added to video images output to a TV screen, such as a menu for controlling the operation of the DVDP 120 and the VCR 110 and a macrovision error message.

The output block 150 receives the output signals from the DVD encoder 124, the selector 130, and the OSD block 160 and outputs DVD video signals, DVD audio signals, VCR video signals, and VCR audio signals. The peripheral devices such as the TV or audio devices are connected to the output block 150 and, thus, video and audio images are output from the peripheral devices.

The input block 140 is connected to the selector 130, and transmits an externally input signal to the selector 130. A signal output terminal of the external device, such as a camcorder, is connectable to the input block 140. Accordingly, the signal recorded on the external device can be transmitted to the combo system 100 through the input block 140, and also can be recorded on the magnetic tape using the VCR 110 or can be played through the TV or a monitor.

Figure 3:
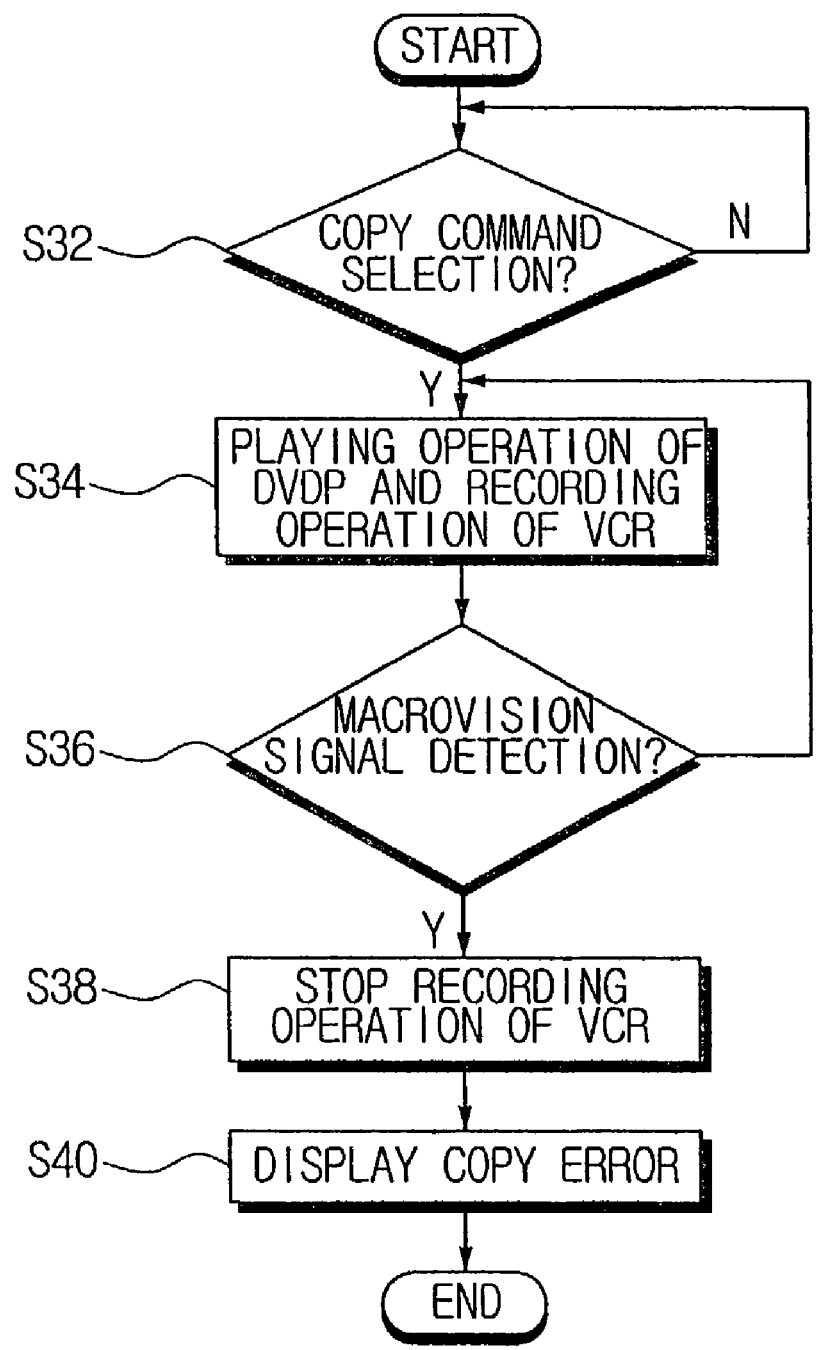
FIG. 3 is a flow chart illustrating a copy error preventing method performed by the system shown in FIG. 2.

FIG. 3 is a flow chart illustrating a copy error preventing method performed by the DVDP/VCR combo system 100. In more detail, FIG. 3 is a flow chart illustrating the copy error preventing method in which the user copies data recorded on the DVD to the magnetic tape.

If a power source is applied to the combo system 100, the OSD block 160 outputs a data processing menu and displays the same on the TV screen. If the user selects a copy mode from the data processing menu displayed on the TV screen by manipulating the remote controller 180, a copy mode setting signal is transmitted to the VCR controller 114 through the remote controller sensor 118. At operation S32, the VCR controller 123 detects whether a copy command has been input.

Once the copy command is input, the VCR controller 114 outputs the copy mode setting signal to the DVD controller 123. At operation S34, the DVD controller 123 operates the DVD deck 121 in accordance with the copy mode setting signal to play the data recorded on the DVD and at the same time operates the macrovision detector 126. Also, the VCR controller 114 drives the VCR deck 111 so as to record the signal played by the DVDP 120 on the magnetic tape.

In the above copy mode, at operation S36, the macrovision detector 126 determines whether a macrovision signal exists in the data recorded on the DVD. If it is determined that there is a macrovision signal in the data recorded on the DVD, the DVD controller 123 outputs the macrovision signal to the VCR controller 114.

At operation S38, the VCR controller 114 stops driving of the VCR deck 111 in accordance with the macrovision signal. At this time, the DVDP 120 continues to play the data recorded on the DVD. Generally, the data recorded on the DVD is copied to the magnetic tape when the data recorded on the DVD is played. Accordingly, once a copy prevention signal, such as a macrovision signal is detected, an unnecessary copy operation can be avoided by stopping the VCR deck 111 from recording data on the magnetic tape. The playing operation by the DVDP 120 continues to be performed, thereby providing the user with convenience.

At operation S40, the VCR controller 114 displays a copy error. The copy error may be output from audio output terminals of the output block 150 through the audio block 113. Also, the copy error may be output as character or video signals generated in the OSD block 160 and then displayed on the TV screen. Also, the copy error may be output as characters or signs displayed through the display block 116. Further, if there is no macrovision signal, a normal copy operation is performed.

Additionally, in the case where the data is recorded on the magnetic tape according to the user's request while the data is played from the DVD, all the operations to detect the macrovision signal are performed in a same manner as if the copy mode is selected. However, the operation to detect the macrovision signal is different from the operation of the copy mode in that the DVD deck 121 is continuously driven to perform the playing operation even if the macrovision signal is detected.

Figure 4:
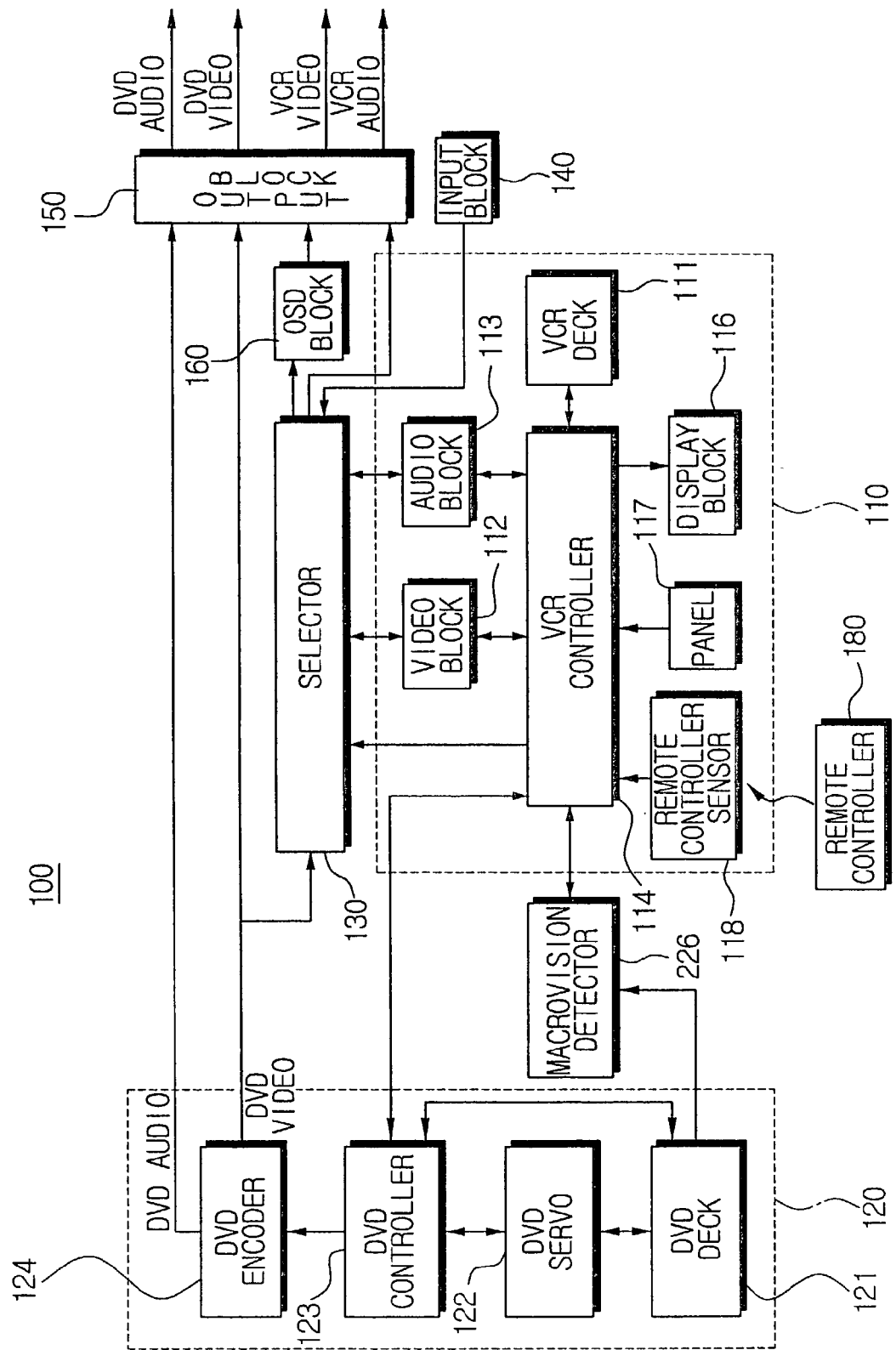
FIG. 4 is a block diagram illustrating a DVDP/VCR combination system in accordance with a second embodiment of the present invention.

FIG. 4 is a block diagram illustrating a DVDP/VCR combo system in accordance with a second embodiment of the present invention. In the second embodiment of the present invention, like reference symbols indicate the same or similar components shown in FIG. 2 and their detailed description will be omitted.

Unlike the first embodiment of FIG. 2 in which a macrovision detecting signal is transmitted to the VCR controller 114 through the DVD controller 123, in the second embodiment of the present invention, the DVDP/VCR combo system 100 is provided with a macrovision detector 226 directly connected between the VCR controller 114 and the DVD deck 121. Therefore, the macrovision signal detected by the macrovision detector 226 is directly transmitted to the VCR controller 114. As a result, unlike the first embodiment shown in FIG. 2, one controller, controls the playing operation and the recording operation. In FIG. 2, the playing operation is controlled by the DVD controller 123 and the recording operation is controlled by the VCR controller 114.

Furthermore, as another embodiment of the present invention, in addition to the combo system, a protocol established between a player, such as the DVDP, and a recorder, such as the VCR, is set using a cable to perform communication, so that a copy error between the player and the recorder can be prevented from occurring. That is, in a state where the protocol is set to mutually exchange the data and the control signals between the DVDP, to play the data recorded on the DVD, and the VCR, to record data on the magnetic tape, or to play the data recorded on the magnetic tape, a method of copying signals recorded on the DVD to the magnetic tape will be described below.

Generally, the DVDP includes the components of the DVDP 120 shown in FIG. 2. Specifically, the DVD controller 123 in the DVDP controls the operation of the DVDP and exchanges control signals and data with the VCR, the DVD deck 121 plays the data recorded on the DVD under the control of the DVD controller 123, and the macrovision detector 126 detects a macrovision signal included in the played signal.

Also, a general VCR includes the components of the VCR 110 shown in FIG. 2,. Specifically, the VCR controller 114 in the VCR controls the operation of the VCR and exchanges control signals and data with the DVDP, and the VCR deck 111 plays the data recorded on the magnetic tape or records predetermined data on the magnetic tape under the control of the VCR controller 114. The VCR further includes the display block 116 to externally display the status of the VCR such as operational, control, and setting modes, the panel 117 to input various commands from the user, and the remote controller sensor 118 to input the commands from the user through a remote controller 180.

Therefore, if it is intended to copy the data recorded on the DVD on the magnetic tape using the individual DVDP and the individual VCR, the DVDP plays the data recorded on the DVD and detects the macrovision signal from the played signal. Then, the DVDP performs the playing operation while the VCR stops the recording operation. Thus, a copy error can be prevented from occurring by implementing the copy error preventing method of the combo system shown in FIG. 3. As described above, the combo system and the copy error preventing method thereof according to the present invention have, for instance, the following advantage: if the data recorded on the DVD having a copy preventing signal, such as a macrovision signal is copied onto the magnetic tape, unnecessary copying operation can be avoided and reliability in the operation of the combo system can be improved.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A system provided having a play unit to play a signal recorded on a first recording medium and a recording unit to record the signal played by the play unit on a second recording medium, comprising:
   a detector to detect whether a predetermined copy preventing signal exists within the signal played by the play unit, wherein the play unit has a deck; and
   a controller, positioned in the recording unit, to control the recording unit to stop a recording operation of the recording unit and to control the play unit to continue to play the signal recorded on the first recording medium when the copy preventing signal is detected by the detector,
   wherein the detector is directly connected to the deck of the play unit and the controller of the recording unit.

2. The system according to claim 1, wherein the recording unit comprises a VCR to record the signal on a magnetic tape.

3. The system according to claim 2, wherein the play unit comprises a DVD player to play the signal recorded on a DVD.

4. The system according to claim 1, further comprising a display block to externally display a signal indicative of whether the copy preventing signal has been detected.

5. The system according to claim 4, wherein the recording unit comprises a VCR to record the signal on a magnetic tape.

6. The system according to claim 5, wherein the play unit comprises a DVD player to play the signal recorded on a DVD.

7. The system according to claim 1, wherein the copy preventing signal comprises a macrovision signal.

8. A system controlling method of a system provided with a play unit and a recording unit, comprising:
   playing a signal recorded on a first recording medium using the play unit, wherein the play unit has a deck;
   recording the signal onto a second recording medium using the recording unit, wherein the recording unit has a controller;
   detecting whether a predetermined copy preventing signal exists within the signal played by the play unit; and
   stopping a recording operation of the recording unit and continuing to play the signal recorded on the first recording medium when the copy preventing signal is detected within the played signal,
   wherein the detector is directly connected to the deck of the play unit and the controller of the recording unit.

9. The system controlling method according to claim 8, wherein the recording unit comprises a VCR to record the signal on a magnetic tape.

10. The system controlling method according to claim 9, wherein the play unit comprises a DVD player to play the signal recorded on a DVD.

11. The system controlling method according to claim 8, further comprising externally displaying a signal indicative of whether there is the copy preventing signal within the played signal.

12. The system controlling method according to claim 11, wherein the recording unit comprises a VCR to record the signal on a magnetic tape.

13. The system controlling method according to claim 12, wherein the play unit comprises a DVD player to play the signal recorded on a DVD.

14. The system controlling method according to claim 8, wherein the copy preventing signal comprises a macrovision signal.

15. A system controlling method between a play unit and a recording unit, comprising:
   playing a signal recorded on a first recording medium using the play unit, wherein the play unit has a deck;
   recording the signal onto a second recording medium using the recording unit, wherein the recording unit has a controller;
   detecting whether a predetermined copy preventing signal exists within the signal played by the play unit;
   stopping a recording operation of the recording unit and continuing to play the signal recorded on the first recording medium when the copy preventing signal is detected within the played signal,
   wherein the detector is directly connected to the deck of the play unit and the controller of the recording unit.

16. The system controlling method according to claim 15, wherein the recording unit comprises a VCR to record the signal on a magnetic tape.

17. The system controlling method according to claim 16, wherein the play unit comprises a DVD player to play the signal recorded on a DVD.

18. The system controlling method according to claim 15, further comprising externally displaying a signal indicative of whether the copy preventing signal exists within the played signal.

19. The system controlling method according to claim 18, wherein the recording unit comprises a VCR to record the signal on a magnetic tape.

20. The system controlling method according to claim 19, wherein the play unit is a DVD player to play the signal recorded on a DVD.

21. The system controlling method according to claim 15, wherein the copy preventing signal comprises a macrovision signal.

22. A system, comprising:
   a play unit to play video and/or audio signals recorded on a first recording medium, wherein the play unit has a deck;
   a recording unit to record the video and/or audio signals on a second recording medium, wherein the recording unit has a controller;
   a detector to detect a copy preventing signal from the video and/or audio signals played by the play unit, wherein the detector outputs the detected copy preventing signal to the recording unit to stop the recording unit from recording the video and/or audio signals on the second recording medium while the play unit continues to play video and/or audio signals recorded on the first recording medium; and
   an OSD block to add an OSD function to the video signals of the play unit and a detected copy preventing error message,
   wherein the detector is directly connected to the deck of the play unit and the controller of the recording unit.

23. The system as recited in claim 22, wherein the recording unit comprises:
   video and audio blocks transmitting and receiving video and audio signals to be recorded or played to and from the recording unit,
   a display block displaying a status of the recording unit, and
   a recording unit controller controlling an operation of the recording unit.

24. The system as recited in claim 23, wherein the play unit comprises:

a deck reading data recorded on the first recording medium to perform a play mode, a servo receiving the data read by the deck and outputting the video and/or audio signals, and a play unit controller controlling an operation of the play unit.

25. The system as recited in claim 24, wherein the play unit controller and the recording unit controller are linked to generate signals to control the play unit and the recording unit, respectively.

26. The system as recited in claim 24, wherein the recording unit controller and the play unit controller are separately provided and the recording unit controller is used as a main controller of the system.

27. The system as recited in claim 24, wherein the play unit controller comprises a main controller of the system or a menu controller comprising both functions of the recording unit controller and the play unit controller.

28. The system as recited in claim 24, wherein the play unit comprises a DVDP and the recording unit comprises a VCR.

29. The system as recited in claim 24, wherein the detector is directly connected between the recording unit controller and the play unit, where one of the controllers exclusively controls the playing and recording of the video and/or audio signals.

30. The system as recited in claim 29, wherein the copy preventing signal from the detector is directly transmitted to the recording controller.

31. The system as recited in claim 24, wherein the play unit comprises the detector, where the play unit controller controls the playing of the video and/or audio signals and the recording controller controls the recording operation of the video and/or audio signals.

32. The system as recited in claim 24, further comprising a protocol established between the play unit and the recording unit using a cable to perform communication, so that a copy error between the play unit and the recording unit is prevented from occurring.

33. The system as recited in claim 32, wherein the copy preventing signal is output as characters, signs, or video signals and displayed on a TV screen.

34. The combo system as recited in claim 32, wherein the copy preventing signal is output from audio output terminals.

35. A system controlling method of a system having a play unit and a recording unit, comprising:

detecting a copy command by the recording unit, wherein the recording unit has a controller;

outputting a copy mode setting signal from the recording unit to the play unit, wherein the play unit has a deck;

playing data recorded on a first recording medium using the play unit in response to the copy mode setting signal;

recording the data onto a second recording medium using the recording unit;

determining whether a copy preventing signal exists in the data recorded on the first recording medium;

outputting the copy preventing signal to the recording unit; and stopping the recording unit from recording in response to the copy preventing signal without discontinuing playing the data recorded on the first recording medium, wherein the detector is directly connected to the deck of the play unit and the controller of the recording unit.

36. The method as recited in claim 35, wherein the copy preventing detector is enabled when the data recorded on the second recording medium is played.

* * * * *

UNITED STATES PATENT AND TRADEMARK OFFICE
CERTIFICATE OF CORRECTION

| | | |
|---|---|---|
| PATENT NO. | : 7,437,056 B2 | Page 1 of 1 |
| APPLICATION NO. | : 10/145027 | |
| DATED | : October 14, 2008 | |
| INVENTOR(S) | : Hong-gyu Han | |

It is certified that error appears in the above-identified patent and that said Letters Patent is hereby corrected as shown below:

Column 10, Line 9, change "combo system" to --system--.

Signed and Sealed this

Tenth Day of February, 2009

JOHN DOLL
*Acting Director of the United States Patent and Trademark Office*